United States Patent [19]

Rusinoff

[11] Patent Number: 5,728,428
[45] Date of Patent: Mar. 17, 1998

[54] COMPOSITION FOR PROTECTING A BODY OF CONCRETE, A PROCESS FOR PREPARING SAME, AND A METHOD FOR THE PROTECTION OF A BODY OF CONCRETE

[75] Inventor: Alexander Rusinoff, San Francisco, Calif.

[73] Assignees: Nadia Rusinoff; Helen Rusinoff, both of San Francisco, Calif.

[21] Appl. No.: 456,704

[22] Filed: Jun. 1, 1995

[51] Int. Cl.$^6$ .............. B05D 3/12; B05D 5/00; C04B 14/00; C04B 22/00
[52] U.S. Cl. ............ 427/292; 106/734; 106/799; 106/815; 106/817; 106/819; 427/136; 427/299
[58] Field of Search ............... 106/734, 799, 106/815, 817, 819; 427/136, 292, 299

[56] References Cited

FOREIGN PATENT DOCUMENTS 55-051745  4/1980  Japan .................. 106/819

OTHER PUBLICATIONS

WIPDS abstract No. 93-150265, which is an abstract of Soviet Union Patent Specification No. 1,733,414 (May 1992).

*Primary Examiner*—Anthony Green
*Attorney, Agent, or Firm*—Ilya Zborovsky

[57] ABSTRACT

A new composition for the protection of a body of concrete sodium nitrate, sodium carbonate, sodium sulfate, calcium chloride, calcium carbide, lime, cement, and sand in a percent ratio of (0.9–1.8):(2–3):(2.5–3.6):(0.05–0.15):(0.75–1.15):(0–8–1):(36–40):(49–39.3) mixed with 8 to 10% of water. A process for preparing the composition involves comminution of certain components to a predetermined range of particle size and a treatment to insure certain ranges of moisture content of various components of the composition. A new method for the application of the protective composition involves the preparation of the surface being protected to increase the exposed surface area of the surface being protected by a factor of 1.15 to 1.36.

14 Claims, No Drawings

COMPOSITION FOR PROTECTING A BODY OF CONCRETE, A PROCESS FOR PREPARING SAME, AND A METHOD FOR THE PROTECTION OF A BODY OF CONCRETE

FIELD OF THE INVENTION

The invention relates to building materials and construction and may be used in the preparation and use of mortar mixes for forming protective coats on the surface of prefabricated and cast-in-place concrete and reinforced concrete structures of buildings and installations in civil engineering, industrial construction and the like with the aim of improving and/or restoring surface tightness and strength.

BACKGROUND OF THE INVENTION

Compositions of mortar mixes (or cement-based mixes) are known to have a polyfunctional effect and are able to actively affect the structure of concrete and eliminate undesirable side effects of components of various additives (Neville, Adam M. Properties of Concrete. UK. London. 1993). However, when a protective composition is applied to the surface of a structure to be protected, there is a problem of incompatibility of characteristics of the protective layer and of the concrete that is being protected. The incompatibility becomes manifest in 3 to 5 years in the form of cracking and separation of the protective layer. This is true for both mineral and polymeric additives in both liquid and colloidal phases. The incompatibility in terms of temperature expansion also occurs rather often, especially in a climate or in production spaces with frequent changes in ambient temperature and humidity.

The efficiency of protective coating layers in general depends on the following conditions:

1. Surface preparation (Protection of Concrete. Conference of Dundee, Scotland, UK, 11–13 Sep., 1990, London, Cambridge).

2. Setting time for the surface crust of the protective layer (Neville, Adam M. Properties of Concrete. UK. London. 1993).

3. Ability to penetrate into the system of concrete pores (Penetron. Instruction of BURK CO. N.Y. 1993).

The majority of prior art compositions have been developed to meet the requirements under items 1 and 2 above. This may be explained by specifications requirements that have mainly to do with admissible residual characteristics or admissible degree of wear. Maximum wear level of 3 to 5% had been adopted very long ago in Europe, in the USA and Great Britain. At the same time, this requirement has not been imposed until very recently in other countries (Russia, China). They used to adopt a 10 to 15% level as the admissible degree of wear between overhauls. This explains different requirements imposed upon properties of protective compositions, and this is the reason why it is not possible to make a sensical comparison between popular protective compositions used for the protection and restoration of concrete structures.

OBJECTS OF THE INVENTION

It is an object of the invention to provide a composition for the protection of a body of concrete in the form of an aqueous mineral mortar suitable for application to a prepared concrete surface which can insure an improved protection of a body of concrete.

Another object of the invention is to provide a composition of the above type that can insure improved characteristics of the resulting protective layer thanks to a new chemical mechanism of reactions occurring after its application.

Further object of the invention is to provides a process for the preparation of a composition of the above type that enhances the protective and strength improving properties of the resulting protective layer.

Finally, it is an object of the invention to provide a method for the protection of a body of concrete by applying the composition of the above type that can insure better results while being simpler in its implementation.

SUMMARY OF THE INVENTION

With the above and other objects and advantages in view, the invention provides a new composition for the protection of a body of concrete comprising the following combination of mineral components mixed with water: sodium nitrate, sodium carbonate, sodium sulfate, calcium chloride, calcium carbide, lime, cement, and sand. These components are used in the proportioning to be described in detail below.

The invention also provides a process for preparing the above composition that involves a special preparation of some components aimed at improving useful properties of the composition and of a protective layer formed of this composition on the surface of a body of concrete. The process involves certain steps of comminution of certain components to a predetermined range of particle size and a treatment to insure certain ranges of moisture content of various components of the composition according to the invention.

Finally, the invention also provides a new method for the application of the above composition that involves the preparation of the surface being protected with the provision of a certain exposed surface area of the surface and with a predetermined rate of application of the composition according to the invention to obtain the best results.

A composition for the protection of a body of concrete comprises the following components, in percent by weight:

| | |
|---|---|
| sodium nitrate | 0.9–1.8 |
| sodium carbonate | 2–3 |
| sodium sulfate | 2.5–3.6 |
| calcium chloride | 0.05–0.15 |
| calcium carbide | 0.75–1.15 |
| lime | 0.8–1 |
| cement | 36–40 |
| sand | 49–39.3 |
| water | 8–10. |

It should be noted that each of the above components of the composition has its specific function. The quantitative proportioning of the components within the above-specified limits are such as to insure a relay-type reaction between the various components and between the components and products of intermediate reactions. It should also be noted that gross deviations from the above-specified limits for each and every component would inevitably bring about negative results and cause impairment of protective layer properties that can be even lower than the initial characteristics of the surface being protected.

The description that follows is given in support of the above proportioning of the various of the composition according to the invention.

Sodium nitrate ($NaNO_3$) is used to accelerate hardening and also to inhibit corrosion of reinforcement in case a reinforced concrete structure is to be protected. If sodium nitrate level is below 0.9%, it cannot react with calcium hydroxide. The use of this component in excess of 1.8% by weight of the composition can result in an accelerated structure forming. If such is the case, all other components of the composition will not have time to react to the full extent. Sodium carbonate ($Na_2CO_3$) is a plasticizer and a compacting hardening accelerator that improves concrete strength. If the level of this component is below 2%, it cannot succeed in delaying a premature structure formation within colloidal phases of cement stone. If added in excess of 3%, this component can cause an excessive gel formation and delayed formation of cement stone.

Sodium sulfate ($Na_2SO_4$) is used as a plasticizer of dispersed reaction products to insure uniformity of properties and phase equilibrium of the body of mortar which is a multiple-phase system. This component improves flexural and rupture strength and also enhances permeability properties. If added in an amount below 2.5%, sodium sulfate cannot plasticize the resulting mortar mix, and the mortar structure is of a non-uniform density ranging from 4044 Lb./cub. yard (2000 kg/cu. m) to loose structures. This component added in excess of 3.6% will decelerate setting to an inadmissible extent thus resulting in a loose protective layer.

Calcium chloride is used as strong electrolyte that causes dissociation of anion-cation dipolar molecules to increase the yield of reaction of cement hydration and to raise pH of the pore fluid so as to improve frost resistance and permeability properties. With a level of calcium chloride below 0.05%, no dissociation reactions will take place, and pH of the pore fluid will remain unchanged. Used in an amount above 0.15% in the composition of the invention, calcium chloride will cause an increase in surfacing of hydroxyl salts with a strong trend toward evaporation. This results in salt spots and white flakes appearing first at the corners of bodies of concrete.

Calcium carbide is used to insure an intensive gas removal from the protective layer and for enhancing the formation of a dense crust of the protective layer due to the exothermic heat of reaction of calcium carbide quenching. The resulting crust prevents liquid electrolyte from evaporating from the surface being protected. If calcium carbide level in the composition according to the invention is below 0.75%, there is no catalytic effect of the above-mentioned kind. The same component used in excess of 1.15% can cause a premature dehydration and cracking of the protective layer being formed because of the exothermic overheating.

Lime is used as an absorbent for dry components during the first stage of preparation of the composition in the dry mix form and also as a plasticizer for coarse-grained components of the composition at the second stage of preparation (mixing with water). If a lime level in the composition is below 0.8%, the above functions of absorption and plasticizing cannot be insured, and if added in excess of 1%, lime can cause gravity separation of mortar.

Cement is used as a binder for this mortar composition. It is the primary component for forming structure of a strong protective layer. Used in an amount lower than 36% cement cannot insure an adequate strength of the resulting protective layer, and with a cement level in excess of 40% shrinkage cracking of the protective layer can occur.

Sand is used as an aggregate forming a matrix to be filled with uniformly distributed components of the protective composition at the first stage of preparation (dry mixing). The use of sand in excess of 49% impairs strength of the resulting protective layer, and less than 39% of sand can result in increased temperature and shrinkage deformations.

Water is used as a solvent for the various mineral components of the composition and as the primary component of cement hydration reaction. A water level less than 8% is inadequate to complete reactions between the various mineral components of the composition and hydration of cement. If water is added in excess of 10%, concentration of the various mineral components of the composition is decreased, cement setting is delayed, and setting quality of cement paste is lowered.

It will be apparent to those skilled in the art that the above composition and proportioning of components including the limits of their contents as given and supported above are aimed at insuring an improved protection of the surface of a body of concrete and represent a new combination of limitations for obtaining a new result of the invention.

It will be understood that the above-described composition may be prepared in a variety of known per se ways and can still provide for a new result of the invention. For example, all components of the above-described composition may be mixed by using a sequence, techniques and equipment that are well known to those skilled in that. This is why such process and equipment are not described here in full detail.

It is, however, preferred that this composition be prepared in two stages, with various components being prepared in a predetermined manner so as to further enhance useful result of the invention thanks to a better initial quality of the composition as will be described later.

When the above-described composition is mixed with water and applied to a surface of concrete being protected, a number of consecutive and simultaneous reactions take place between the components of the composition and between them and cement components as follows:

1. $CaO + H_2O \Rightarrow Ca(OH)_2$ (1)
2. $Ca(OH)_2 + CaCl_2 \Rightarrow \downarrow Ca(OH)Cl_2 + CaOH$
3. $Ca(OH)_2 + NaNO_3 \Rightarrow \downarrow Ca(OH)NO_3 + NaOH$
4. $Ca(OH)_2 + Na_2SO_4 \downarrow \downarrow CaSO_4 + 2NaOH$
5. $Ca(OH)_2 + Na_2CO_3 \Rightarrow \downarrow CaCO_3 + 2NaOH$ Free calcium oxide of cement forms calcium hydroxide when mixed with water (reaction 1). Calcium hydroxide then takes part in exchange reactions with sodium nitrate and calcium carbonate and sulfate and with calcium chloride of the protective composition to form low-soluble and hardly-soluble acicular crystals of hydroxonitrates Ca(OH) $NO_3(1)$ that will continue to grow well after completion of structure forming of cement stone by using free pore water and Ca ions released from cement stone gel. These crystals have a micro-reinforcing effect on segregation within voids under the effect of temperature, shrinkage and corrosion. Therefore, a primary structure reinforcement framework is formed within the protective layer as early as at the setting stage. This framework is built up in the direction of mass transfer of a diffusion flow, i.e., in the direction deep into the pore system of the body of concrete being protected.

Hardly soluble double salts of calcium solfoaluminate $3CaAl_2O_3CaSO_4 \cdot 31H_2O$ are crystallized at the same stage. The crystals are in the form of hexagonal syngonite-like structures or a package of parallel laminae with interstices filled with intercrystalline solutions. The density, volume and strength of the entire package depends on density of such solutions. When moisture gets into the interstices from the ambient medium, the solutions are diluted, and the package volume increases. Given the conditions in the pore space of concrete, this is the explanation of an exponential decrease in permeability with time during tests. If temperature decreases, the intercrystalline solutions break into crystalline hydrates and solutions of residual concentration. The volume of the interstices decreases, and density and strength of structure as a whole increase to ensure a high frost resistance.

During a further maturing stage, low-soluble double salts of calcium nitrochloroaluminate $2CaOAl_2O_3Ca(OH)Cl_2 \cdot 10H_2O$ are formed on the primary framework in the form of the same hexagonal syngonite-like structures. However, concentration of intercrystalline solutions is so high that their density does not almost change with an inflow of moisture from outside. High level of molecular bonds is explained by the effect of chlorine ions upon dipolar water molecules. This phenomena is similar to the case where water is magnetically treated before mixing concrete components to improve concrete strength.

The components of the composition according to the invention react in the following sequence:

$$Cl_2 > NO_3 > SO_4 \tag{2}$$

Adding chlorine ions to the compounds dissolved in water has a polarizing effect on dipolar water molecules to lower the level of molecular bonds of water. Owing to weak bonds in the presence of calcium hydroxide, an alkali group is released into the water to protect calcium against dissolution at the maturing stage:

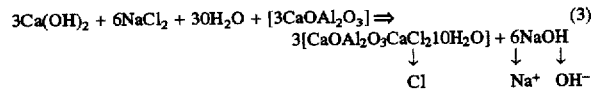

Tricalciumalumochloride formed as a result of reaction (3) forms hardly soluble solid phases when water is released for simultaneous hydration reactions. The alkali and the internal pore moisture form solutions inhibiting metal corrosion that also have a low eutectic temperature of $-126°$ F. ($-70°$ C.) at the stage of a stable phase condition of cement stone.

At the stage of unstable phases, owing to weak bonds of water molecules that are depolarized with chlorine ion and weak bonds of the reaction products, nitrate ions come to react, and the sequence of these reactions is determined by their inherent chemical activity, alkali level of the solution and the intermediate reaction product—calcium aluminate—with which the following dissociation reaction is most likely:

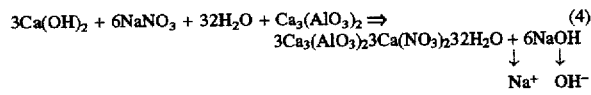

This reaction yields a low-soluble double salt of calcium hydronitroaluminate with an increase in pH of the pore fluid. The stability of reaction (4) is insured by an almost simultaneous reaction of sodium sulfate. The consumption of starting components for another reaction (5) results in their shortage and in a one-way character of dissociation:

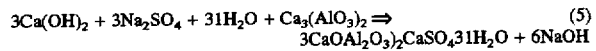

yielding calcium hydrosulfoaluminate.

Therefore, if such an electrolyte is added at a concentration that insures a change in solubility of mineral binders without reacting with them, with a subsequent formation of hardly soluble complex compounds—calcium hydrosulfoaluminate, calcium chloroaluminate and tricalcium chloroaluminate—from the resulting solution, the overall volume of the crystalline component of the structure increases all at once in parallel with normal concrete cure.

The advantage of complex additives is explained by the fact that although the rate of formation of double salts is lower then in the case of a single additive (which is due to the consumption of calcium aluminate of the liquid phase for hydration), cement components can react at a lower reaction constant. Moreover, a protracted reaction allows the ion force of free water (which later becomes the pore fluid) so as to form saturated solutions and to form additional double hydrate salts.

Calcium-containing electrolytes accelerate hydration and hardening of silicate phases of cement owing to a higher probability of formation of three-dimensional germs of a new phase. These electrolytes also disperse the products of hydration through dissociation with anion-cation groups:

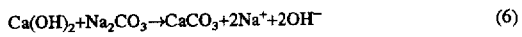

The above-described processes insure a high hardening rate and a fast rise of strength of the protective layer.

The use of additives containing a complex of sodium and chloride insures a better use of the potential of allire $3CaOSiO_2C_3S$. Chloride ions that are still in the liquid phase are products of displacement. They form solvation shells at the boundaries of cation fields thereby preventing free calcium from leaving the structure-forming reactions. At the same time, nitrate ions accumulate in the free water polarized with chlorine ions to form solutions of increasing ion strength. These solutions will, in turn, accelerate hydration of allite. The manifest relay-like character of these processes allows allite to develop to a greater extent into a symmetrical three-dimensional conglomeration with isotropic properties.

The above-described processes insure the adhesion of the protective layer to the surface of concrete, the protection of reinforcement against corrosion, density and low permeability of structure to a depth of penetration of electrolyte into the body of concrete being protected.

The additives containing $NaNO_3$ and $Na_2SO_4$ also participate in exchange reactions similar to (6). It should be, however, noted that these components used as herein disclosed decelerate dissociation of ions because of accumulation of NaOH alkali in the aqueous solution in the presence of calcium hydroxide. This allows the group of belites $\beta 2CaOSiO_2$ ($\beta$—$C_2S$) that are lagging in their development in comparison with allite to cause an exponential increase in the group of calcites and silicates that failed to be attached in previous hydration reactions. As the components causing formation of calcium solfoaluminate are well soluble, and sulfate ion is present in the solution at a high concentration after displacement, the aluminate available in the system is fully bound into sulfoaluminate during setting of the structure. With further curing of the protective composition, no sulfoaluminate is formed, and this results in an improved sulfate resistance of the protective layer and better strength and frost resistance.

Adding electrolytes results in intensification of chemical reactions and better solubility of cement clinker minerals in water. They also accelerate the exchange reactions. The resulting products of hydrolysis and hydration, which are in the form of crystals and gel, actively coagulate. It should be noted that gel expands due to the absorption of a large amount of water. This enhances adhesion of the aggregate of the mix and results in clogging of pores and compaction of concrete stone.

It should be noted that adding calcium carbide improves isotropism of the protective layer structure. It is known that a scatter of test results for protective compositions is mainly associated with, and depends on ambient temperature and mixing water temperature. These temperatures affect the rate and completeness of the above-described reactions. Adding calcium carbide stabilizes the local temperature field of the mix during the time of calcium carbide quenching. A stable calcium carbide quenching reaction is insured by making the specific choice of particle size and moisture content of calcium carbide and also of water/cement ratio as disclosed herein.

It has been found that the additives containing chlorine, nitrate and sulfate ions can have a negative effect if the proportioning of the respective components of the composition according to the invention deviates from that disclosed herein. Excessive amounts of calcium chloride may cause calcium spots to appear on the surface as a result of a worse solubility of the initial phases and fresh-formed compounds. An excess of sodium nitrate and sodium carbonate results in an increase in pH of pore fluid. An excessive accumulation of pore fluid causes an alkaline corrosion of siliceous aggregate and silicates of cement stone. The formation of calcium sulfoaluminate crystals is limited by the rate of dissolution of gypsum available in cement. Therefore, in the case of an excess of sodium sulfate, low-soluble calcium hydrosulfoaluminate and calcium carbonate crystals formed against the background of an excess of sodium sulfate expand during completion of hardening of the structure. This is the reason why micro-cracks that cannot be eliminated by wetting of the surface layer appear at the final stage of hardening of the protective layer. This lowers strength and density of the structure.

Therefore, the relay-like character of the reactions results in a rapid formation of a primary framework of acicular crystals of calcium hydroxo-salts at the stage of setting of the protective layer. This framework is overgrown with lamellar crystals of calcium sulfoaluminate, calcium nitrochloroaluminate and calcium hydrosilicate. The formation of hardly-soluble crystalline structures raises density of cement stone and acts like a micro-reinforcement. These structures reduce permeability of concrete and preserve its plastic properties.

A common micro-reinforcement framework is formed in the zone of contact between the protective layer and the surface of the body of old concrete. This framework functions like a cross-linking formation extending to the depth of penetration of electrolyte. Micro-cracks and voids in the old concrete are not only blocked off at their mouth portions, but they are also clogged to complete sealing of the surfaces. This effect is referred to as "self-healing" of concrete. The formation of a common reinforcing framework within the contact layer insures a high tensile strength, and penetration deep into the pore system of the old concrete results in a permeability that is comparable with that of the permeability of the protective layer.

A short setting time, high compressive strength, high tensile and flexural strength, low permeability, sulfate and alkali resistance, frost resistance and low labor effort for the preparation and use—those are the main characteristics of the composition according to the invention that has both penetrating and clogging effect.

PREPARATION OF THE COMPOSITION OF THE INVENTION

In its preferred form, a process for preparing the composition according to the invention is divided into two stages: preparation of a dry mix and preparation of a water mix or mortar proper.

For preparing a dry mix, the various components of the composition are preferably prepared as described below.

Sodium nitrate, sodium carbonate, sodium sulfate and calcium chloride are checked for moisture content and are dried, if necessary to a moisture content of 3 to 6%. If these components are dried to a moisture level below 3%, the ambient humidity will work to cause an intensive moisture absorption up to a hygrometry equilibrium level. If a moisture level in these components is above 6%, they can spontaneously react and degenerate.

Calcium carbide is comminuted, e.g., by crushing, to a range of particle size to a fraction of 0.063" to 0.118" (0.16–0.30 mm) and is then dried in any appropriate drier to a moisture content of 6 to 8%. If comminuted to a particle size finer than 0.063" (0.16 mm), calcium carbide does not exhibit the desired intensity of hydrate decomposition and cannot insure the required temperature as a result of hydration. With particles coarser than 0.118" (0.30 mm), calcium carbide cannot be uniformly distributed within the bulk of dry mix so as to insure the simultaneous carbide reaction through the entire body of a fresh-placed protective layer. Calcium carbide cannot be at a moisture content below 6% because of a so called critical mass of hydrate groups. The component will lose its principal properties and structure beyond this critical mass. Calcium carbide can decompose with a moisture content in excess of 8%.

Lime is dried, preferably in an electric furnace at 2012° F.–2732° F. (1000° C.–1500° C.) during 4 hours to a moisture content of 2 to 3% and comminuted to a fraction of 0.063" to 0.079" (0.16–0.20 mm). The temperature limits given above insure the minimum moisture content of 2% on the one hand, and on the other hand, allow the roasting effect that could be conducive to a lower quenching capacity to be avoided. The above-given particle size range insures the desirable time for lime reaction with water. With a particle size below 0.063" (0.16 mm), the quenching reaction will lose intensity and will be rather protracted to cause an excessive gas release to the surface of the resulting protective coating and shrinkage. With particles coarser than 0.079" (0.20 mm), uniform distribution of lime within the bulk of dry mix becomes a problem.

Sand is sieved to a fraction of 0.063" to 0.079" (0.16 to 0.20 mm) and is dried, preferably in an electric furnace at 302° F. to 392° F. (150° C. to 200° C.) during 4 hours to obtain a moisture content of 3% and to remove organic matter and is then comminuted to a fraction of 0.063" to 0.079" (0.16 to 0.20 mm). This treatment is necessary to have an optimum sand matrix to be filled with the other components of the mix and to prevent organic matter from impairing protective properties and long-term quality of the resulting protective layer.

The conduct of the process of preparation of the composition according to the invention at this stage depends on the manner in which the composition is to be used. If the composition according to the invention is to be stored as a ready-made dry mix for further use and/or distribution and shipment to potential customers, it is loaded, after adding cement, to a mixer and mixed for 35 to 50 minutes in a known manner. The resulting dry mix can be stored in 40–55 Lb. (18–25 kg) paper bags for one year. For application, this dry mix has to be mixed with water in the amount specified above to prepare a mortar in a known manner.

If the composition according to the invention is to be used immediately after the preparation of the dry mix as described above, water can be metered during 15 minutes into the same mixer without turning it off, and the composition will be ready for application.

It will be apparent to those skilled in the art that the above-described process for preparing the composition according to the invention insures an enhanced result of the invention owing to a combination of steps and limitations recited in the appended claims.

METHOD FOR THE PROTECTION OF A BODY OF CONCRETE

The main distinction of a method for the protection of a body of concrete with the use of the composition described above is the preparation of concrete surface before application of the composition according to the invention. The outer surface of a body of concrete to be protected is treated by forming depressions in this outer surface to obtain a total exposed surface area that is 1.15 to 1.36 times as great as the surface area of outer surface of the body of concrete before such treatment. This results in a prepared concrete surface being formed. Therefore, it is the main aim of the method for the protection of a body of concrete to insure the formation of a greater exposed surface of concrete than that existent before its preparation. There is a big variety of methods that can be used to increase the surface area of the exposed surface of concrete. Concrete surface can be treated with the help of various mechanical devices, e.g., percussive tools either with individual tool bits or with multiple bits and also with the help of circular blade or diamond wheel cutters. In any case, the particular method, procedure or tool used to enlarge the exposed surface of concrete is immaterial for the invention result. What is important is the combination of the ratio at which the exposed concrete surface is increased (1.15 to 1.36) with the composition according to the invention as described above in detail that is applied to thus increased exposed concrete surface. The preparation of concrete surface by increasing its exposed surface area by a factor of 1.15 to 1.36 results in an increased wetted area of wetting of concrete surface with a decrease in surface tension.

A reduced surface tension insures an increase in capillary suction depth thus enhancing penetration of components of the composition according to the invention deep into the subsurface layer of the body of concrete being protected.

It is known that the rate of evaporation from a surface is expressed as follows:

$$U = (P_n - P) \times C \times S / P_o \quad (7)$$

wherein C is a constant, S is the evaporation surface area, $P_n$ is the saturated vapor pressure, P is the pressure of liquid vapor over the free liquid surface, $P_o$ is the outer barometric pressure. It can be seen that an irregular surface would dry faster than a smooth surface if they are equally wetted. Surface tension for an irregular surface is lower than surface tension for a smooth surface:

$$\sigma = A/S, \quad (8)$$

wherein A is the work of isothermal surface formation.

With an increase in the concrete surface area being wetted by making any depressions in a concrete structure, the degree of wetting described by the following formula also increases:

$$U = \frac{CS}{P_0} (P_n - P) \quad (9)$$

wherein U is the surface tension value at three interfaces: 1 is for liquid, 2 is for gas and 3 is for a solid.

Finally, the treated surface will have a greater capillary suction depth owing to an increase in the degree of wetting as described by Jurin formula:

$$\cos \Theta = \frac{U_{23} - U_{13}}{U_{12}} \quad (10)$$

wherein r is the radius of capillary, d is the density of liquid, and g is the acceleration of gravity.

Ions of electrolyte of the protection composition penetrate to a depth of capillary suction and are deposited without any changes in direction of movement. The absence of such deposition in some prior art methods does not allow solid crystalline phases to be formed within the pore system from solutions.

The result of the above mechanism of penetration and deposition is an improvement of strength and permeability properties of the concrete subsurface which adds to the protective effect of the protective layer formed by the composition of the invention applied to the prepared concrete surface. As the exposed surface of concrete is made larger by forming depressions in the surface of concrete, penetration of components of the protective composition and products of their reaction into the body of concrete occurs not only through the originally existent surface of concrete, but also through inner side walls of the above-mentioned depressions, i.e., starting from points that are located well deep within the subsurface layer of the body of concrete being protected. Thus, if depressions 0.12" to 0.16" (3 to 4 mm) deep are made in concrete surface, it means that active substances of the protective composition and their reaction products can penetrate deep into the body of concrete starting from a depth of 0.12" to 0.16" within the subsurface layer of concrete. If the exposed surface area of concrete surface of a body of concrete is extended by a factor of less than 1.15, the effect of an increased capillary suction will not be sufficient to warrant the use of such procedure. For practical reasons, it is not advisable to increase the exposed surface of concrete by a factor greater than 1.36 because the resultant depressions can impair concrete strength, and size and/or spacing of such depression can cause cracking of concrete which is undesirable.

The prepared surface of concrete is wetted with a water application rate of at least 1.3 gallon/sq. yard (6 l/sq. m) to enhance capillary action. The mortar of the protective composition prepared as described above is then applied to the surface to be protected at a rate of at least 9 Lb./sq. yard (4.8 kg/sq/m). The rate of application is given as per unprepared surface area of concrete. This will give a thickness of the resulting protective layer of about 0.16" (0.4 mm). This is an optimum thickness from the point of view of both covering capacity and low shrinkage cracking.

Properties of the composition according to the invention have been tested after application of the composition to concrete specimens. Central compression and frost resistance were tested with cubes of 3.93" (10 cm). Bending tests and tests for sulfate and alkali corrosion were conducted with 6"×6"×20" (15×15×15 cm) beams. Rupture tests were conducted with bobbin specimens 20" (50 cm) long and 1.5" (4 cm) in diameter. Permeability was tested with 6" (15 cm) cylinders 12" (30 cm) high. Except for control, five 28-day specimens of each series were put in water for 24 hours and were then coated with the protective composition according to the invention. Two series of beams were put into 5% aqueous solution of sodium sulfate and 4% aqueous solution of sulfuric acid, respectively, for 36 hours. The test results are given in Table 1.

Examples of compositions that have been used in the tests are given below.

PRACTICAL EXAMPLES AND TEST RESULTS

EXAMPLE 1

Prior art

A protective composition for structures operating in aggressive sulfate environments (Reduction of Concrete Permeability [Ponizhenie pronitsaemosti betona] by Yu. V. Chekhovsky. Moscow. Energiya Publishing Co. 1968, p. 127–128) was used for comparison. The composition contained the following components, in percent by weight:

| | |
|---|---|
| sodium carbonate | 2.0 |
| sodium chloride | 0.5 |
| alumina | 0.8 |
| sodium sulfate | 2.4 |
| ash | 12 |
| cement | 25 |
| sand | 52.3 |
| water | 5.0 |

The specimens were allowed to stay in water for 24 hours and were then coated with the protective composition at a rate of 10 Lb./sq. yard (5 kg/sq. cm), with a layer of 0.18" (0.5 cm).

EXAMPLE 2

Unprotected Concrete Specimens

Concrete specimens were prepared of a mix containing 250 Lb. (113 kg) of cement (3000 PSI or 210 kg/sq. cm), 1345 Lb. (610 kg) of sand, 2426 Lb. (1100 kg) of gravel with a particle size 0.197"–0.787" (0.5 to 2 cm), and 58 gallon (220 l) of water.

Compositions According to the Invention

EXAMPLE 3

A composition was prepared with the following proportioning of components, in percent by weight:

| | |
|---|---|
| sodium nitrate | 0.9 |
| sodium carbonate | 2 |
| sodium sulfate | 2.5 |
| calcium chloride | 0.05 |
| calcium carbide | 0.75 |
| lime | 0.8 |
| cement | 36 |
| sand | 49 |
| water | 8 |

EXAMPLE 4

A composition was prepared with the following proportioning of components, in percent by weight:

| | |
|---|---|
| sodium nitrate | 1.8 |
| sodium carbonate | 3 |
| sodium sulfate | 3.6 |
| calcium chloride | 0.15 |
| calcium carbide | 1.15 |
| lime | 1 |
| cement | 40 |
| sand | 39.3 |
| water | 10. |

EXAMPLE 5

A composition was prepared with the following proportioning of components, in percent by weight:

| | |
|---|---|
| sodium nitrate | 1.5 |
| sodium carbonate | 2.5 |
| sodium sulfate | 3.0 |
| calcium chloride | 0.1 |
| calcium carbide | 1 |
| lime | 0.9 |
| cement | 38 |
| sand | 44.9 |
| water | 9. |

EXAMPLE 6

The composition of Example 5, but without calcium carbide.

EXAMPLE 7

The composition of Example 5, but with calcium carbide having a particle size of 0.2" (0.5 mm) which is 69% coarser in comparison with the invention.

EXAMPLE 8

The composition of Example 5 containing 1% of calcium chloride which 85% greater than recommended herein.

EXAMPLE 9

Control

A composition contained, in percent by weight:

| | |
|---|---|
| sodium carbonate | 5 |
| sodium chloride | 1 |
| aluminum acetate | 3 |
| aluminum sulfate | 5 |
| cement | 17 |
| lost ash | 35 |
| sand | 10 |
| water | 30. |

EXAMPLE 10

Control

A composition contained, in percent by weight:

| | |
|---|---|
| calcium nitrate | 0.55 |
| sodium nitrate | 0.29 |
| sodium carbonate | 0.77 |
| sodium sulfate | 1.5 |
| ash | 0.2 |
| cement | 5– |
| sand | 45.59 |
| lime | 0.2 |
| water | 0.6 |

All samples were allowed to stay in water for 24 hours and were then coated with protective compositions at a rate of 9 Lb./sq/yard (4.8 kg/sq.m) with a layer thickness of about 0.16" (4 mm).

For evaluation of the method for the protection of a body of concrete the surface of an old concrete structure was cleaned from loose surface layer and foreign matter with scrapers or by sand blasting. Then 5 depressions of 4" (10 cm) in diameter and 0.127" (4 mm) deep (one at the center and four at the four corners of a square) were made per 1 sq. yard (1.2 sq. m) of the surface area in the concrete surface.

The depth of such preparation corresponds to the depth of natural carbonization of concrete to an open mouth of pores, and the total exposed surface area of 1.18 sq. yards (1.4 sq. m).

The test results are given in Table 1.

TABLE 1

| Example | Strength test results, MPa | | | | | | Frost resistance, cycles | Corrosion* resistance MPa | Permeability*, atm | Hardening time minutes |
|---|---|---|---|---|---|---|---|---|---|---|
| | Compression | | Flexural | | Rupture | | | | | |
| | 7 | 28 | 7 | 28 | 7 | 28 | | | | |
| 1 | 1.8 | 2.4 | 1.2 | 1.8 | 0.07 | 0.13 | 200 | 0.9/1.1 | 8/6 | 42 |
| 2 | 1.6 | 2.2 | 0.9 | 1.7 | 0.08 | 0.13 | 75 | 0.55/0.8 | 6 | 120 |
| 3 | 2.4 | 2.9 | 1.9 | 2.5 | 0.14 | 0.36 | 350 | 1.7/2.1 | 16/14 | 25 |
| 4 | 2.4 | 2.9 | 1.9 | 2.5 | 0.14 | 0.36 | 350 | 1.7/2.1 | 16/14 | 25 |
| 5 | 2.4 | 2.9 | 1.9 | 2.5 | 0.14 | 0.36 | 350 | 1.7/2.1 | 16/14 | 25 |
| 6 | 2.0 | 2.5 | 1.4 | 2.0 | 0.12 | 0.18 | 250 | 1.1/1.3 | 14/8 | 40 |
| 7 | 2.2 | 2.3 | 1.4 | 1.9 | 0.09 | 0.16 | 250 | 1.4/1.4 | 14/12 | 20 |
| 8 | 2.4 | 3.0 | 1.8 | 2.4 | 0.11 | 0.20 | 300 | 0.6/0.96 | 14/12 | 25 |
| 9 | 1.4 | 2.2 | 1.1 | 1.1 | 0.09 | 0.18 | 90 | 0.9/1.1 | 12/10 | 20 |
| 10 | 1.4 | 1.9 | 0.9 | 1.7 | 0.09 | 0.17 | 300 | 1.1/1.2 | 12/8 | 20 |

*Acid/sulfate corrosion.
**Intact layer/broken layer.

Tests were made with 9 concrete plates of a size of 76.2×76.2×25.4" (30×30×10 mm). Three plates were control and three plates were prepared by making equally spaced crossing grooves 2" (50 mm) wide and 0.130" (4 mm) deep. The surface of test samples was wetted and coated with the protective composition according to the invention at a rate of 9 Lb./sq. yard (4.8 kg/sq.m).

Another three plates were cleaned as descried above, and four holes were drilled for insertion of metal rods 0.762" in diameter to a depth of 1.36". The rods were connected to a controlled DC power supply at 36/220 V. The prepared samples were then coated with a protective composition:

| | |
|---|---|
| cement | 1 Lb. (0.45 kg) |
| sand | 3.2 Lb. (1.44 kg) |
| calcium nitrate | 0.147 Lb. (0.066 kg) |
| calcium chloride | 0.018 Lb. (0.081 kg) |
| sodium nitrate | 0.173 Lb. (0.078 kg) |

The coating rate was 9 Lb./sq. yard (4.8 kg/sq. m). The surface was electrically treated. Voltage was switched automatically at a rate of 0.066 min$^{-1}$. The treatment time was 4 hours.

All samples were tested for permeability in a hydraulic pressure test plant and were then put into water, face down, for surface wetting during 8 hours. The plates were then tested again for permeability in the same plant. The samples were then tested with a sclerometer to assess the surface strength. The protective layer was then removed, and the samples were again tested for permeability. The test results are given in Table 2.

TABLE 2

| Properties | Control samples | Prior art samples | Treatment according to the invention |
|---|---|---|---|
| Permeability w/protection layer, atm | 4 | 12 | 16 |
| Permeability after wetting, atm | 4 | 8 | 16 |

TABLE 2-continued

| Properties | Control samples | Prior art samples | Treatment according to the invention |
|---|---|---|---|
| Permeability w/o protection layer, atm | — | 6 | 14 |
| Surface strength, MPa | 1.5 | 2.4 | 2.4 |

Permeability Test Procedure

Cylindrical specimens (diam. 15 cm and length 30 cm) were put into a hydraulic press. The specimens were water pressure tested with a pressure increments of 2 atm. every 8 to 10 hours. The test was completed when a first drop can be seen on the specimen surface.

Corrosion Resistance Test Procedure

The effect of sulfate and alkali corrosion were tested with concrete beams (15×15×20 cm). The beams were allowed to stay for 36 hours in aqueous solutions of 5% sodium sulfate and 4% sulfuric acid. The beams were then tested for flexural strength (or compression or rupture). A strength decrease by more than 5% was regarded as inadmissible.

It will be apparent to those skilled in the art from what is described above that the invention allows old concrete to be reliably protected against chemical attacks and corrosion, and its surface strength and frost resistance can be greatly improved.

It is understood that the protective composition can be used irrespective of the method for the protection of concrete. The use of this composition would not be compromised if it is prepared by using conventional mixing techniques. On the other hand, it will be apparent that the combined use of the composition, process for its preparation and method for the protection of concrete allows the best results of the invention to be had.

Various other modifications can be made in the composition according to the invention without departure beyond the spirit and scope of the appended claims. Thus the composition may contain other additives (such as plasticizers and the like) that are normally used with concrete and mortar mixes without affecting the invention result.

I claim:

1. A composition for the protection of concrete, said composition comprising the following components, in % by weight:

2. A process for preparing a composition for the protection of concrete, said process comprising:
   comminuting calcium carbide to a particle size of 0.063" to 0.118" (0.16–0.30 mm);
   treating lime at 2012° F. to 2732° F. (1000°–1500° C.) for 4 hours to a moisture content of 2 to 3% by weight to prepare dried lime and comminuting the resulting dried lime to a particle size of 0.063" to 0.079" (0.16 to 0.2 mm);
   mixing under stirring said comminuted calcium carbide having a moisture content of 6 to 8% by weight and said comminuted treated lime with sodium nitrate, sodium carbonate, sodium sulfate, calcium chloride, cement, sand and water with the following proportion of said components, in % by weight:

3. The process of claim 2, wherein sodium nitrate, sodium carbonate, sodium sulfate, calcium chloride have a moisture content of 3 to 6% by weight.

4. The process of claim 2, wherein, prior to said mixing, said sand is sieved to a fraction of 0.063" to 0.079" (0.16–0.2 mm) and dried at 302° F. to 392° F. (150°–200° C.) for 4 hours to a moisture content of maximum 3% by weight.

5. The process of claim 3, wherein prior to said mixing, said sand is sieved to a fraction of 0.063" to 0.079" (0.16–0.2 mm) and dried at 302° F. to 392° F. (150°–200° C.) for 4 hours to a moisture content of maximum 3% by weight.

6. A method for the protection of a body concrete having an outer surface, said method comprising:
   treating said outer surface of said body of concrete by forming depressions in said outer surface to obtain a total exposed surface area that is 1.15 to 1.36 times as great as the surface area of said outer surface of said body of concrete before said treatment to form a prepared concrete surface;
   applying to said prepared concrete surface a protective composition comprising the following components, in % by weight:

7. The method of claim 6, wherein said composition is applied at a rate of at least 9 Lb./sq./yard (4.8 kg/sq.m) as calculated for dry mix.

8. The method of claim 6, wherein said prepared concrete surface is wetted before applying said protective composition.

9. The method of claim 7, wherein said prepared concrete surface is wetted before applying said protective composition.

10. The method of claim 6, wherein calcium carbide has a particle size of 0.063" to 0.118" (0.16–0.30 mm) and a moisture content of 6 to 8% by weight and lime has a particle size of 0.063" to 0.079" (0.16 to 0.2 mm) and a moisture content of 2 to 3% by weight.

11. The method of claim 10, wherein sodium nitrate, sodium carbonate, sodium sulfate, calcium have a moisture content of 3 to 6% by weight.

12. The method of claim 11, wherein said composition is applied at a rate of at least 9 Lb./sq./yard (4.8 sq.m) as calculated for dry mix.

13. The method of claim 11, wherein said prepared concrete surface is wetted before applying said protective composition.

14. The method of claim 12, wherein said prepared concrete surface is wetted before applying said protective composition.

* * * * *